(12) United States Patent
Venkatramani

(10) Patent No.: US 9,473,383 B1
(45) Date of Patent: Oct. 18, 2016

(54) METHOD AND APPARATUS FOR ROUTING IN TRANSACTION MANAGEMENT SYSTEMS

(71) Applicant: Juniper Networks, Inc., Sunnyvale, CA (US)

(72) Inventor: Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 31 days.

(21) Appl. No.: 13/630,706

(22) Filed: Sep. 28, 2012

Related U.S. Application Data

(60) Provisional application No. 61/568,519, filed on Dec. 8, 2011, provisional application No. 61/576,723, filed on Dec. 16, 2011.

(51) Int. Cl.
| | |
|---|---|
| *H04W 4/00* | (2009.01) |
| *H04L 12/701* | (2013.01) |
| *H04L 12/715* | (2013.01) |
| *H04L 12/721* | (2013.01) |

(52) U.S. Cl.
CPC ............... *H04L 45/00* (2013.01); *H04L 45/46* (2013.01); *H04L 45/72* (2013.01)

(58) Field of Classification Search
CPC ...................................................... H04L 45/00
See application file for complete search history.

(56) References Cited

U.S. PATENT DOCUMENTS

| | | | |
|---|---|---|---|
| 2005/0102170 A1* | 5/2005 | Lefever et al. | 705/4 |
| 2005/0273424 A1* | 12/2005 | Silverman et al. | 705/39 |
| 2006/0085317 A1* | 4/2006 | Allen | G06Q 40/04 705/37 |
| 2008/0189428 A1* | 8/2008 | Godwin et al. | 709/230 |
| 2008/0320003 A1* | 12/2008 | Heinson et al. | 707/10 |
| 2013/0103787 A1* | 4/2013 | Glover et al. | 709/217 |

* cited by examiner

*Primary Examiner* — John Blanton
(74) *Attorney, Agent, or Firm* — Cooley LLP

(57) ABSTRACT

An apparatus comprises a routing module configured to receive a data unit having a code indicator. The routing module is configured to identify a virtual destination address based on the code indicator. The routing module is also configured to replace a destination address of the data unit with the virtual destination address to define a modified data unit. The routing module is further configured to send the modified data unit.

17 Claims, 7 Drawing Sheets

METHOD AND APPARATUS FOR ROUTING IN TRANSACTION MANAGEMENT SYSTEMS

CROSS-REFERENCE TO RELATED APPLICATIONS

This application claims priority to U.S. Provisional Patent Application No. 61/568,519, entitled "METHOD AND APPARATUS FOR TICKER ROUTING", filed on Dec. 8, 2011 and U.S. Provisional Patent Application No. 61/576,723, entitled "METHOD AND APPARATUS FOR TICKER ROUTING", filed on Dec. 16, 2011, which are incorporated herein by reference in their entirety.

BACKGROUND

Some embodiments described herein relate generally to transaction management systems, and more particularly, to methods and apparatus for increasing efficiency of code based transactions by reducing transaction times.

For example, in typical stock markets, clients initiate transactions on codes (e.g., stock symbols), referred to as tickers (also referred to as transaction codes or codes interchangeably). The transactions may include placing a new order, canceling an existing order, or updating an existing order. Furthermore, devices with high levels of reliability that receive the tickers and perform the actual transactions, referred to as matching engines (also referred to as destination engines), may host (e.g., perform matching process on) multiple tickers. In known transaction management systems, a gateway (e.g., a gateway server) in the data transaction path implements the functionality of looking up a ticker and directing the ticker to an appropriate matching engine where the ticker is hosted and matching process is performed. With high volumes of transactions, however, the gateways can introduce excessive latency and as a result transaction times may drastically increase.

A need exist, therefore, for methods and apparatus to increase transaction efficiency by reducing transaction time.

SUMMARY

In some embodiments an apparatus comprises a routing module configured to receive a data unit having a code indicator. The routing module is configured to identify a virtual destination address based on the code indicator. The routing module is also configured to replace a destination address of the data unit with the virtual destination address to define a modified data unit. The routing module is further configured to send the modified data unit.

DETAILED DESCRIPTION

Figure 1:
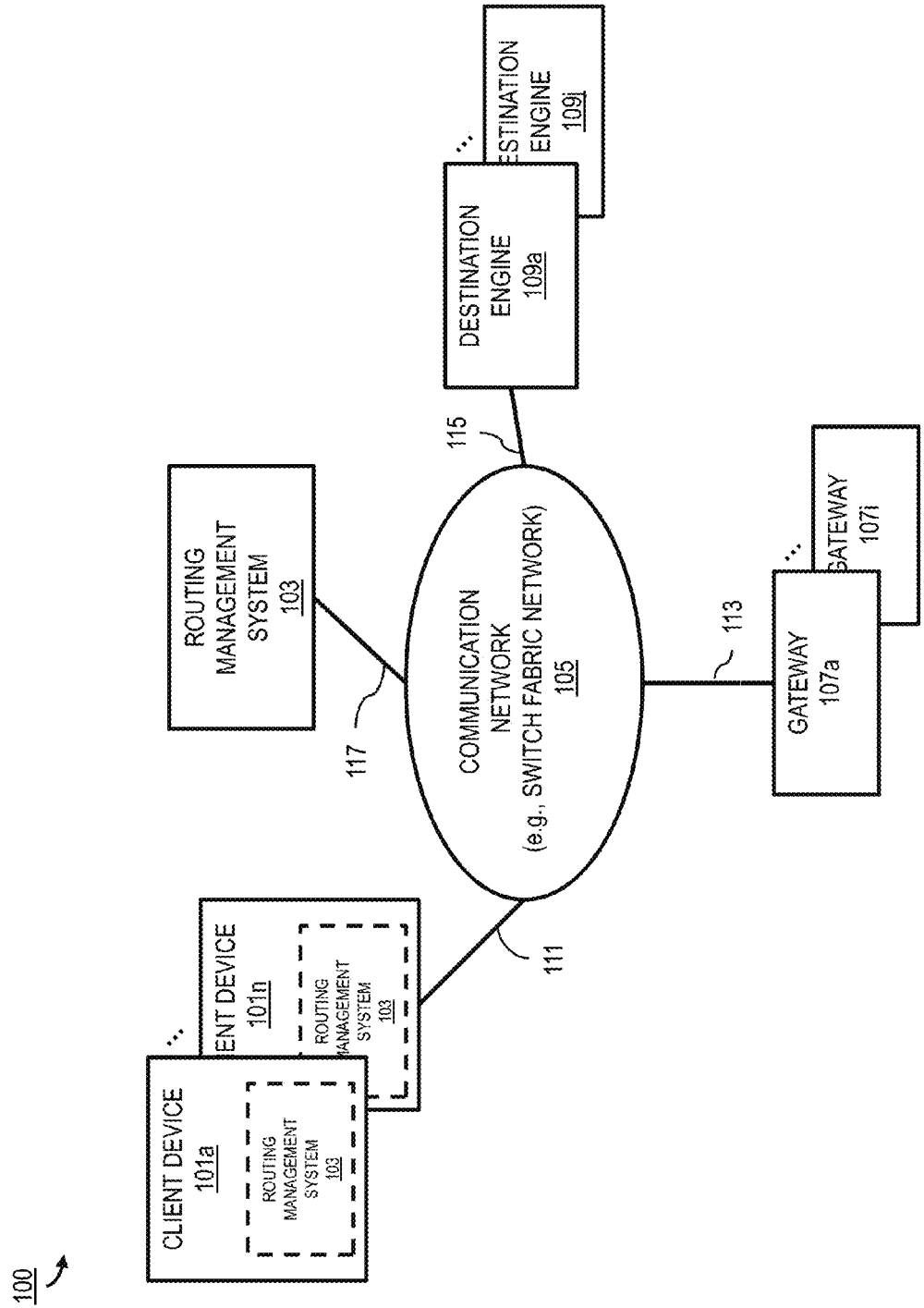
FIG. 1 is a schematic block diagram of a computer network system providing routing in transaction management systems, according to an embodiment.

In a typical known stock market management system, prices of stocks are constantly fluctuating and various interested clients (e.g., buyers, sellers, brokers, news agencies, etc.) would like to see those fees in real time. To meet this desire, a transaction management system such as a stock market management system can provide up-to-the-minute price quotes through its computer network. The computer networks can monitor allocation of trades among competing bids and offers by components/devices of the transaction management system referred to as matching engines and then send that data to various interested clients. Trades initiated by clients (buyers, sellers, or their brokers) are received as trade requests at the stock market management system through hundreds of computers (e.g., at least one computer for each broker dealer) via networks such as switch fabrics, where network ports connect with each other via one or more network switches. The trade requests are routed to a matching engine, a highly reliable computer, via one or more gateways within the computer network. The gateways, in the data transaction path between clients on one hand and the matching engines on the other hand, provide various functionalities such as, for example, looking up the transaction codes (e.g., tickers) within the trade requests and directing the trade requests to the appropriate matching engine, where the transaction codes are hosted (e.g., code matching process and trade allocation is performed). The gateways may also provide security and spoofing checks of client devices.

Once the matching engine has conducted a trade transaction associated with the transaction codes, information about completed transaction is sent from the matching engine to the clients, again via the one or more gateways. A matching engine performs match process for thousands of listed transactions and millions of trade requests on a given day, and each complete transaction cycle includes two flows through a gateway. As a result, the gateways affect the latency of the transactions. Therefore, eliminating the gateways, or reducing gateway role, can significantly reduce the latency of the transactions.

Apparatus, systems and methods are described herein to provide routing in transaction management systems. In some embodiments, an apparatus comprises a routing module configured to receive a data unit having a code indicator. The routing module is configured to identify a virtual destination address based on the code indicator. The routing module is also configured to replace a destination address of the data unit with the virtual destination address to define a modified data unit. The routing module is further configured to send the modified data unit.

In some embodiments, an apparatus comprises a routing module configured to receive a data unit having a code indicator. The routing module is configured to identify a virtual destination address based on the code indicator. The virtual destination address is associated with a set destination engines. The routing module is also configured to replace a destination address of the data unit with the virtual destination address to define a modified data unit. The routing module is further configured to send the modified data unit to a destination engine from the set of destination engines.

In some embodiments, an apparatus comprises a routing module configured to be operatively coupled to a switch fabric without an intervening gateway device. The routing module is configured to receive a data unit having a code indicator. The routing module is also configured to replace a destination address of the data unit with a virtual destination address based on the code indicator to define a modified data unit. The routing module is further configured to send the modified data unit to a destination engine operatively coupled to the switch fabric and associated with the virtual destination address.

In some embodiments, the transaction time can be significantly reduced by eliminating the gateway. Gateway elimination allows separation of control functionality of the gateway (e.g., mapping the tickers to matching engines) from the forwarding functionality of the gateway (e.g., directing packets from clients to matching engines, security checks on transactions, etc.). Furthermore, gateway elimination enables implementing the forwarding functionality of the gateway in the switching infrastructure (e.g., switch fabric) handling the transaction. In such embodiments, the gateway functionality can be distributed by taking into account the limitations of the data transaction paths of the client and the switching infrastructure so that an implementable solution exists where no single part of this distributed gateway implementation is overly complex.

As used herein, the singular forms "a," "an" and "the" include plural referents unless the context clearly dictates otherwise. Thus, for example, the term "a "destination engine" is intended to mean a single destination engine or a combination of destination engines (e.g., destination engines associated with a series of clines, transaction management systems, etc.).

FIG. 1 is a schematic block diagram of a computer network system providing routing in transaction management systems, according to an embodiment. A computer network system 100 can include one or more client devices 101a-101n, a routing management system 103, one or more gateways 107a-107i, one or more matching engines or destination engines 109a-109j, each of which can be operatively coupled to each other via a communication network 105, where the communication network 105 may include one or more switching infrastructures (e.g., switched fabric networks). Thus, FIG. 1 is merely an example illustrating the types of devices that can be included within a computer network system 100.

Communication network 105 can be any communication network that is configurable to allow the one or more client devices 101a-101n, the routing management system 103, the one or more gateways 107a-107i, and the one or more destination engines 109a-109j to communicate with communication network 105 and/or with each other through communication network 105. Communication network 105 can be any network or combination of networks capable of transmitting information (e.g., data and/or signals) and can include, for example, a telephone network, an Ethernet network, a fiber-optic network, and/or a wireless network. Furthermore, the communication network 105 can be a switch fabric network as disclosed by the U.S. patent application Ser. No. 12/495,337, entitled "METHODS AND APPARATUS RELATED TO ANY-TO-ANY CONNECTIVITY WITHIN A DATA CENTER", filed on Jun. 30, 2009, which is incorporated herein by reference in its entirety.

In some instances, communication network 105 can include multiple networks operatively coupled to one another by, for example, network bridges, routers, switches and/or gateways. For example, the client devices 101a-101n can be operatively coupled to a wireless network; the destination engines 109a-109j, and/or the routing management system 103 can be operatively coupled to a fiber-optic network, and/or the one or more gateways 107a-107i can be operatively coupled to an Ethernet network. The wireless network, fiber-optic network and Ethernet network can each be operatively coupled to one another via one or more network bridges, routers, switches, and/or gateways such that the wireless network, the Ethernet network and the fiber-optic network are operatively coupled to form a communication network. Alternatively, the wireless network, the fiber-optic network and the Ethernet network can each be operatively coupled to one another via one or more additional networks. For example, the wireless network, the fiber-optic network and the Ethernet network can each be operatively coupled to the Internet such that the wireless network, the fiber-optic network, the Ethernet network and the Internet are operatively coupled to form a communication network.

As illustrated in FIG. 1, client devices 101a-101n are operatively coupled to communication network 105 via network connections 111; gateways 107a-107i are operatively coupled to communication network 105 via network connections 113; destination engines 109a-109j are operatively coupled to communication network 105 via network connections 115; and the routing management system 103 is operatively coupled to communication network 105 via network connections 117. Network connections 111, 113, 115, and 117 can be any appropriate network connections for operatively coupling client devices 101a-101n, gateways 107a-107i, destination engines 109a-109j, and the routing management system 103. Note each client device 101a-101n, each gateway 107a-107i, each destination engine 109a-109j, and each routing management system 103 is operatively coupled to communication network 105 via a separate network connection 111, 113, 115, and 117, respectively.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one client devices 101a-101n, more than one routing management systems 103, more than one gateways 107a-107i, and more than one destination engines 109a-109j. A client device 101a-101n, a routing management system 103, a gateway 107a-107i, and a destination engine 109a-109j can be operatively coupled to the communication network 105 by heterogeneous network connections. For example, a first client device 101a-101n can be operatively coupled to the communication network 105 by a WWAN network connection, another client device 101a-101n can be operatively coupled to the communication network 105 by a DSL network connection, and a routing management system 103 can be operatively coupled to the communication network 105 by a fiber-optic network connection.

A gateway 107a-107i can be, for example, a server (e.g., a web server) configured to provide electronic devices, such as client devices 101a-101n, web access across the communication network 105. For example, the client device 101a-101n can be in communication with the routing management system 103 via the communication network 105, and a gateway 107a-107i can facilitate communication between the client device 101a-101n and other electronic devices and/or servers. In some embodiments, communication between client devices 101a-101n and the destination engines 109a-109j is managed by the routing management system 103 with gateways 107a-107i eliminated.

The client devices 101a-101n can be any of a variety of electronic devices that can be operatively coupled to communication network 105. A client device 101a-101n can be a personal computer, a laptop computer, a personal digital assistant (PDA), a Smartphone, a portable/mobile internet device and/or some other electronic communication device. The client device 101a-101n can include a web browser configured to access a webpage or website hosted on or accessible via the gateway 107a-107i over communication network 105. The client devices 101a-101n can be configured to support, for example, HTML using JavaScript. For example, the client device 101a-101n can include a web browser, such as, Internet Explorer, Firefox, Safari, Opera and Chrome. An Internet page or website can be accessed by a user of a web browser at a client device 101a-101n by providing the web browser with a reference such as a uniform resource locator (URL), for example, of a webpage. For example, a user of a client device 101a-101n can access a destination engine 109a-109j via a URL designated for the destination engine 109a-109j. In some instances, client devices 101a-101n can include specialized software for accessing a web server other than a browser, such as, for example, a specialized network-enabled application or program. In some instances, portions of a website accessible via a web server can be located in a destination engine 109a-109j accessible to the client device 101a-101n. Furthermore, any of the components/devices of system 100 may have access to one or more data stores (not shown). A data store can be at least one of a database, a data warehouse, or a file. A client device 101a-101n can also include a display, monitor or user interface, a keyboard, various ports (e.g., a USB port), and other user interface features, such as, for example, touch screen controls, audio components, and/or video components (each not shown). A client device 101a-101n can be operatively coupled to communication network 105 via a user interface and network connection 111.

The gateways 107a-107i, in general, provide interface among communication networks 105 or among components/devices of communication networks such as, for example, mapping between networks and/or components/devices (e.g., client devices 101a-101n, destination engines 109a-109j, routing management system 103, etc.), forwarding data between networks and/or components/devices, etc.

The destination engines 109a-109j are components/devices of a transaction management system that allocate transactions based on code indicators received from client devices 101a-101n and provide the results of or the indicators of the allocated transactions to the client devices 101a-101n.

In some instances, the routing management system 103 allows separation of the control functionality of a gateway 107a-107i for mapping code indicators to the destination engines 109a-109j, from the forwarding functionality of the gateway 107a-107i for directing data packets from client devices 101a-101n to destination engines 109a-109j, or security checks on transactions, etc. Additionally, the routing management system 103 enables implementation of the forwarding functionality of the gateway 107a-107i in the communication network 105 infrastructure. In such instances, the functionalities of gateway 107a-107i can be distributed by taking into account the limitations of data transaction paths of the client devices 101a-101n and the communication network 105, such that the routing management system 103 can provide a routing solution where components of the distributed gateway 107a-107i implementation are not overly complex.

In some instances, every code indicator can be represented by a Virtual Internet Protocol (VIP) address. Using a VIP address allows multiple destination engines 109a-109j to host the same code indicator by performing matching process and trade allocation based on the code indicator. A group of destination engines 109a-109j that host a given code indicator can be referred to as a destination engine group. In some instances, a code indicator can be assigned to a single destination engine 109a-109j at any given time. This indirection of a VIP address per code indicator provides, for example, a mechanism for handling potential failures of destination engines 109a-109j.

In some instances, the client devices 101a-101n can address their transactions to a VIP address. As a result, the client devices 101a-101n can remain anonymous to the destination engines 109a-109i because the VIP address does not indicate the physical address of the client device 101a-101n. Furthermore, using VIP addresses can protect the destination engines 109a-109j, for example, for security and operations purposes, because the physical IP addresses of the destination engines 109a-109j are not exposed to client devices 101a-101n.

In some instances, where a code indicator is assigned to multiple destination engines 109a-109j, each transaction can be directed independently to every member of the destination engine group that hosts that code indicator. The IP addresses associated with the destination engines 109a-109j that collectively provide service for a specific code indicator, communicate (send and receive signals) between themselves to maintain consistent state information for destination engines 109a-109j.

In some instances, the gateway 107a-107i that maps transactions associated with the client devices 101a-101n to the destination engines 109a-109j can be completely eliminated. This eliminates two occurrences of application processing in the gateway 107a-107i and the corresponding four trips through the switching infrastructure, within the communication network 105. Furthermore, a hybrid solution can be deployed where the gateway 107a-107i still exists in the data forwarding path for client devices 101a-101m when the elimination of gateways is not implemented. Changes to the client devices 101a-101n, however, can be made to address the VIP address of the code indicator in the destination IP address (DIP). In such instances, management of the flow of data between client devices 101a-101n, the communication network 105, and the destination engines 109a-109j by the routing management system 103 without an intervening gateway 107a-107i, allows elimination of gateways. The data flow is discussed in more detail in FIGS. 6 and 7.

In some instances, the client devices 101a-101n are modifiable. In these instances, the routing management system 103 can modify components of the client devices 101a-101n responsible for determining a data transaction path for transmission of code indicators to the destination engines 109a-109j. For example, such a modification can cause the client device to send code indicators directly to the destination engines 109a-109i, eliminating the gateways 107a-107i. In some instances, however, the routing management system 103 may not have authorization for modification of or access to modify the client devices 101a-101n. In such instances, the components/devices of the communication network 105 responsible for receiving the code indicators from client devices 101a-101n and sending them to the gateways 107a-107i are modified, by the routing management system 103, such that the code indicators received from the client devices 101a-101n are directly forwarded to the destination engines 109a-109j via a switching infrastructure, within the communication network 105.

Figure 2:
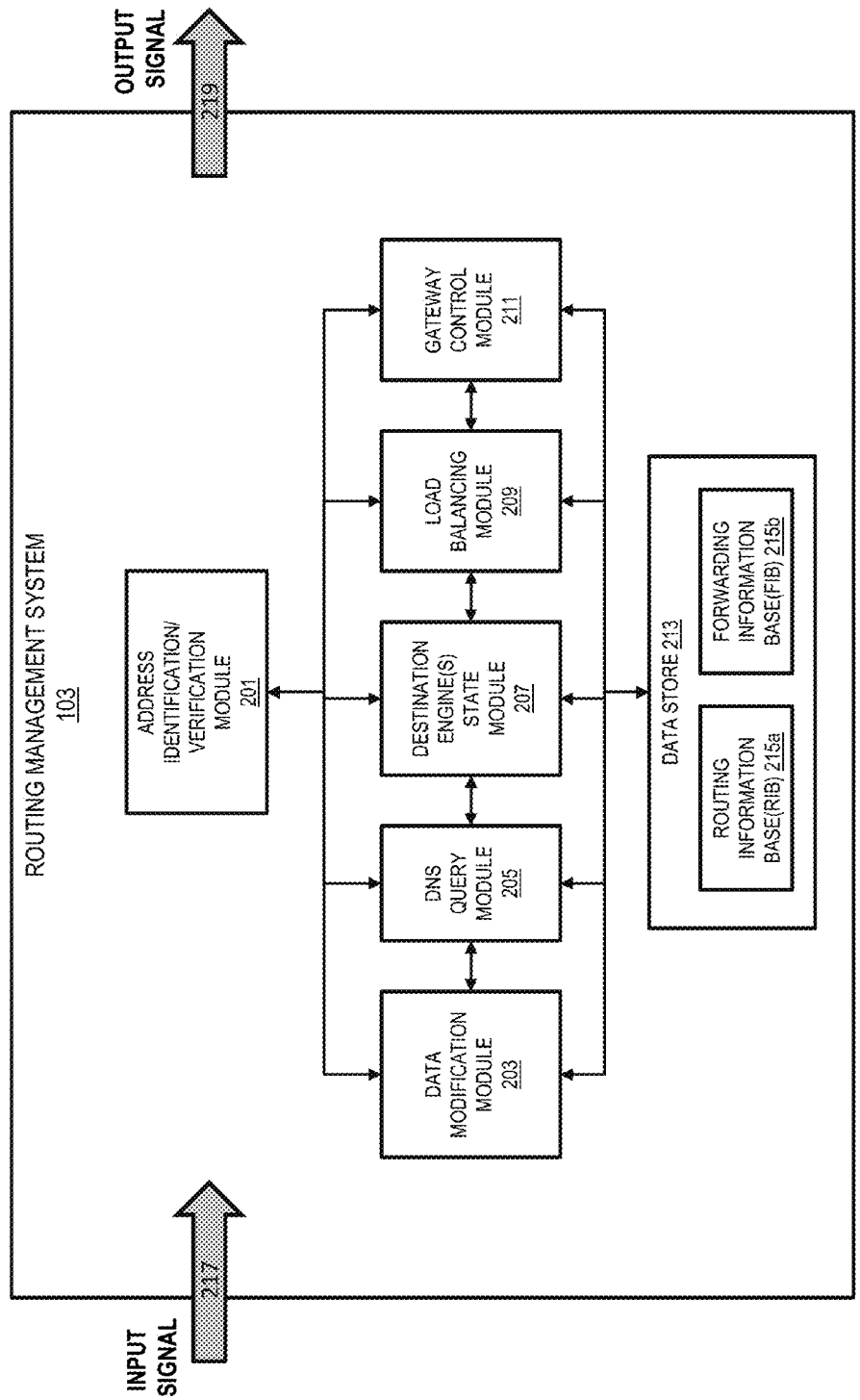
FIG. 2 is a schematic illustration of a routing management system, according to an embodiment.

FIG. 2 is a schematic illustration of a routing management system, according to an embodiment. As shown in FIG. 2, a routing management system 103 includes an address identification/verification module 201, a data modification module 203, a Domain Name Service (DNS) query module 205, a destination engine(s) state module 207, a load balancing module 209, a gateway control module 211, and a data store 213. The data store 213 is a data storage component storing data such as routing information base (RIB) 215a, the forwarding information base 215b and/or any data that is stored during routing management process by the routing management system 103. Furthermore, the routing management system 103 communicates with other components/devices of a communication system, such as communication system 100 of FIG. 1, via input signal 217, and output signal 219.

In various instances, the routing management system 103 and its components may be located anywhere within a communication network system such as that shown in FIG. 1 including, but not limited to, within the client devices 101a-101n, within the destination engines 109a-109j, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The address identification/verification module 201 receives data, including data units, including code indicators (e.g., ticker indicators) from client devices 101a-101n via an input signal 217. A code indicator can be an abbreviation used to uniquely identify publicly traded shares of a particular transaction on a particular transaction management system. The address identification/verification module 201 uses the code indicator to identify a destination address for the data.

In some instances, the data modification module 203 modifies the data and sends the modified data to a recipient, based on the destination address, via an output signal 219. One mechanism for this functionality leverages Domain Name Service (DNS). For example, the routing management system 103 may be disposed within a client device 101a-101n. In these instances the client device 101a-101n sends a DNS query to the DNS query module 205 to request a code indicator. The DNS query module 205 responds to the DNS query with the VIP address of the code indicator (e.g., Ticker) (TVIP address). The client device 101a-101n may store the request and/or the response in a local storage (not shown). Because the response to the DNS query is a VIP address, changes to the association of code indicators to destination engines 109a-109j do not need to be reflected in DNS or cause a clear/update of the client device 101a-101n's cache. Alternatively or in addition, the gateway control module 211 can periodically push the response information to the client devices 101a-101n. For example, a client that wants to perform a transaction on a code indicator T1 can send a message having a source IP address of the client device 101a-101n (CIP) and a destination IP address, which is the Virtual IP address of T1 (e.g., TVIP1 derived from a DNS query as described, and then cached). The gateway control module 211 can maintain the mapping of destination engines 109a-109j to which T1 is assigned. Subsequently, the gateway control module 211 can exchange the mapping information with a switching infrastructure (e.g., a switch fabric) within the communication network 105. This information can be populated by the gateway control module 211, for example, in one or more of memory locations associated with a switching infrastructure within the communication network 105, in a Routing Information Base (RIB) 215a that lists routes to particular network destinations, or in a Forwarding Information Base (FIB) 215b that provides information about proper interfaces for transmitting packets of data by a router.

Returning to FIG. 1, the switching infrastructure within the communication network 105 can maintain the mapping of TVIP1 to a destination engine group 109a-109j as follows. In some instances, each code indicator (e.g. ticker) has an associated route represented as TVIP address and this route can be, for example, an equal-cost multi-path (ECMP). ECMP is a routing strategy where next-hop packet forwarding to a single destination can occur over multiple best data transaction paths that tie for top place in routing metric calculations. ECMP specifies next-hop of the destination engines that are members of the destination engine group 109a-109j. As shown in FIG. 2, the destination engine(s) state module 207 can monitor changes in the state of destination engines 109a-109j and send the state to the gateway control module 211. The gateway control module 211 can maintain the mapping of code indicators to the VIP addresses and exchange the mapping information with the client devices 101a-101n.

In some instances, the load balancing module 209 can use the VIP addresses to load balance transactions associated with each client device 101a-101n, for example, by distribution of the transactions across a set of destination engines 109a-109j. Additionally, the gateway control module 211, which can be an offline module (e.g., with no connection to the communication network 105), can perform a health check on the destination engines 109a-109j and send signals with updated state information to the switching infrastructure within the communication network 105, if the destination engine(s) state module 207 indicates that a change in the state of the destination engines 109a-109j exists. For example, if the switching infrastructure updates the stored information in FIB 215b associated with the destination engines 109a-109j, a change in the state of destination engines 109a-109j can occur. Furthermore, the destination engines 109a-109j can also advertise TVIP addresses hosted by the destination engines 109a-109j, using a protocol such as the Routing Information Protocol (RIP), the Border Gateway Protocol (BGP), etc. The physical IP address of each destination engine 109a-109j and each client device 101a-101n is distributed and updated within the gateways 107a-107i. Additional information on embodiments of an example of a switching infrastructure is provided in pending U.S. Patent Application Publication No. 2010/0061391, entitled "METHODS AND APPARATUS RELATED TO A LOW COST DATA CENTER ARCHITECTURE" which is incorporated herein by reference.

In some instances, the number of code indicators that can be handled by a switching infrastructure within the communication network 105 equals the size of the route table minus the number of destination engines 109a-109j. The client servers (not shown) although within the communication network 105, may not be directly part of a switching infrastructure. In such instances, the client servers can be in a collocation center and behind a router/single subnet. Alternatively, a VIP address can be allocated to a group of code indicators (TG) instead of one VIP address per code. Multiple codes can be mapped to the same TGVIP address. This can reduce the size of FIB 215b substantially, and may have a very low cost (historical load information can be used to determine which code indicators use the same TGVIP address). In some instances, the number of destination engines 109a-109j that can host a code indicator is limited by the ECMP capabilities, or performance capabilities, of the semiconductor devices within the switching infrastructure.

In some instances, the destination engines 109a-109j can directly obtain or access the IP address of a client device 101a-101n or Client IP (CIP) address from a packet that contains a transaction request from the client device. The destination engine's response to the transaction request can be addressed directly to the client server that initiated the transaction request. In some instances, the switching infrastructure within the communication network 105 can also perform the security functionality in the gateway 107a-107i. This prevents the IP address of client device 101a-101n to be spoofed. The destination engine 109a-109j can validate the client device 101a-101n against the client IP address. To avoid spoofing of the client IP address, a binding check can be performed, by the address identification/verification module 201 based on the physical port, the Media Access Control (MAC) address (if the packet is not routed) and/or the CIP address of the client device 101a-101n to verify that the CIP address is authorized. Furthermore, the Dynamic Host Configuration Protocol (DHCP) requests can be snooped, for example, via Dynamic Address Resolution Protocol Inspection (DAI), to provide security for the DHCP services. The security checks can be performed by the address identification/verification module 201, on the client device 101a-101n or on a port of the switching infrastructure, within the communication network 105, connected to the client device 101a-101n. This distributes the binding and access control list (ACL) checks and provides scalability.

Figure 3:
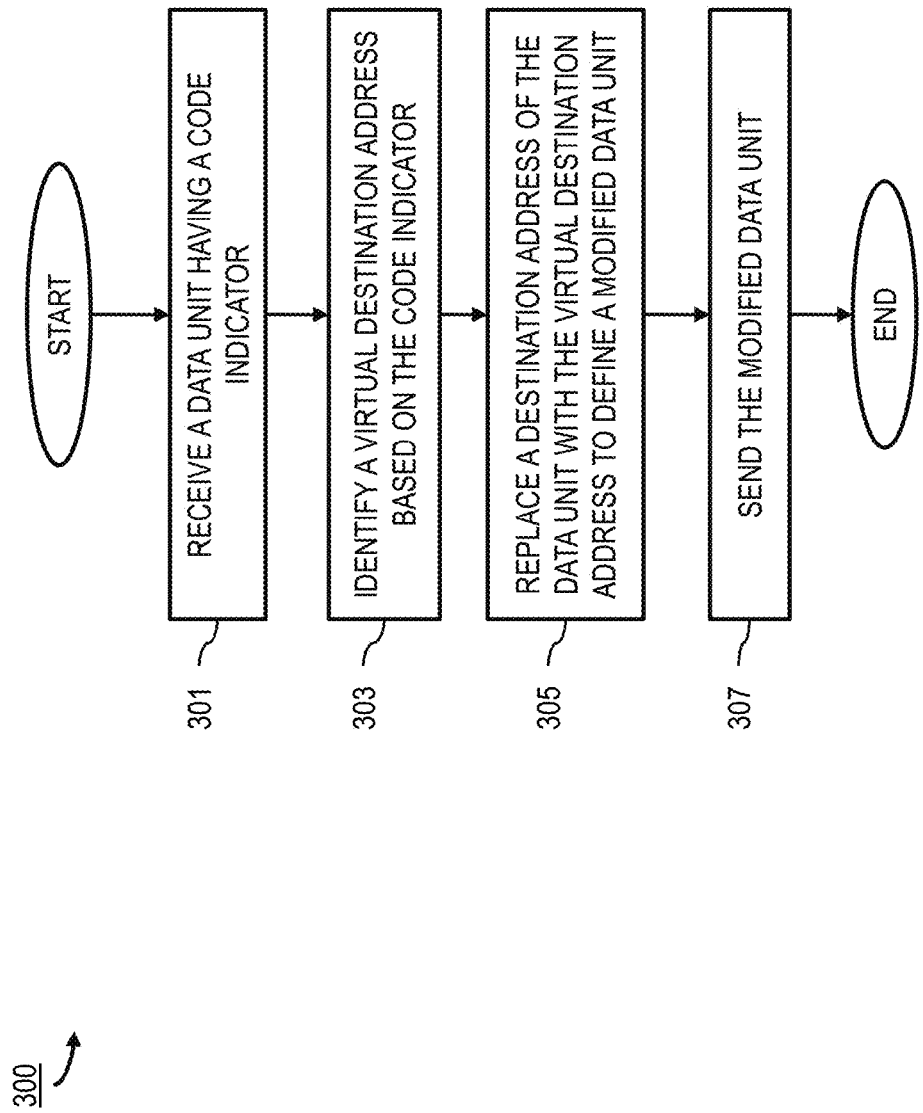
FIG. 3 is a flowchart of a process for providing routing in transaction management systems, according to an embodiment.

FIG. 3 is a flowchart of a process for providing routing in transaction management systems, according to an embodiment. As shown in FIG. 3, at 301, a data unit having a code indicator is received. For example, the data unit can be received at a routing management system 103 via an input signal such as input signal 217 of FIG. 2. Subsequently, at 303, a virtual destination address is identified based on the code indicator. For example, the virtual destination address can be identified by the address identification/verification module 201 of FIG. 2. At step 305, a destination address of the data unit is replaced with the virtual destination address to define a modified data unit. For example, the destination address of the data unit can be replaced by the data modification module 203 of FIG. 2. At 307, the modified data unit is sent to a destination engine 109a-109j. For example, the modified data unit can be sent by the routing management system 103 of FIG. 1 and FIG. 2, via an output signal 219.

In some instances, the process of FIG. 3 can be performed while the routing management system 103 is disposed within a client device 101a-101n and is operatively coupled to a switching infrastructure (e.g., a switch fabric) within the communication network 105 that is operatively coupled to a destination engine 109a-109j associated with a virtual destination address. In such instances, the DNS query module 205 can send a Domain Name Service (DNS) query to the address identification/verification module 201 of FIG. 2, at a time before a process of FIG. 3, based on a code indicator. The DNS query module 205 receives a DNS response from the address identification/verification module 201 having the identified virtual destination address of step 303 in response to the DNS query. Furthermore, the routing management system 103 receives a data unit within the session.

In various instances, discussed herein, the virtual addresses, the modified data units, the DNS queries and any other data items can be temporarily or permanently stored in data store 213, on a local memory associated with a client device 101a-101n (not shown), in a local memory associated with a destination engine 109a-109j, or in any storage area accessible to the routing management system 103 via the communication network 105.

In some instances, the process of FIG. 3 can be performed while the routing management system 103 is disposed within a switching infrastructure element within the communication network 105. The routing management system 103 can be operatively coupled to remaining portions of the switching infrastructure that is operatively coupled to a destination engine 109a-109j associated with a virtual destination address. In such instances, the virtual destination address, discussed above in connection with 303 of FIG. 3, is identified (at 303) by the address identification/verification module 201 based on a code indicator and/or based on a state information associated with the destination engine 109a-109j, identified by the destination engine(s) state module 207.

In some instances, a virtual destination address, discussed above in connection with 303 of FIG. 3, is associated with a set of destination engines 109a-109j. In such instances, the routing management system 103 can send, as discussed above in connection with 305 of FIG. 3, a data unit, modified by the data modification module 203, to a destination engine 109a-109j from the set of destination engines 109a-109j, via an output signal 219.

In some instances, the process of FIG. 3 can be performed while the routing management system 103 is disposed within a switching infrastructure element within the communication network 105, and is operatively coupled to remaining portions of the switching infrastructure that is operatively coupled to a set of destination engines 109a-109j associated with a virtual destination address. In such instances, the address identification/verification module 201 identifies the virtual destination address, discussed above in connection with 303 of FIG. 3, based on a code indicator and a state information associated with the set of destination engines 109a-109j, identified by the destination engine(s) state module 207. The routing management system 103 can send, as discussed above in connection with 305 of FIG. 3, a data unit modified by the data modification module 203, to a destination engine 109a-109j from the set of destination engines 109a-109j, via an output signal 219.

In some instances, the process of FIG. 3 can be performed while the routing management system 103 identifies a virtual destination address, discussed above in connection with 303 of FIG. 3, based on a code indicator and state information associated with a set of destination engines 109a-109j, identified by the destination engine(s) state module 207. The state information can be based on an operative state of each destination engine 109a-109j from of the set of destination engines 109a-109j and/or based on a load balance of the plurality of destination engines 109a-109j, identified by the load balancing module 209. The routing management system 103 can send, as discussed above in connection with 305 and 307 of FIG. 3, a data unit, modified by the data modification module 203, to a destination engine 109a-109j from the set of destination engines 109a-109j, via an output signal 219.

In some instances, the process of FIG. 3 can be performed while the routing management system 103 sends, as discussed above in connection with 305 of FIG. 3, a data unit modified by the data modification module 203, to a destination engine 109a-109j operatively coupled to a switching infrastructure within the communication network 105 that is operatively coupled to a client device 101a-101n without an intervening gateway 107a-107i. The elimination of gateway 107a-107i can improve latency of forward transactions.

Figure 4:
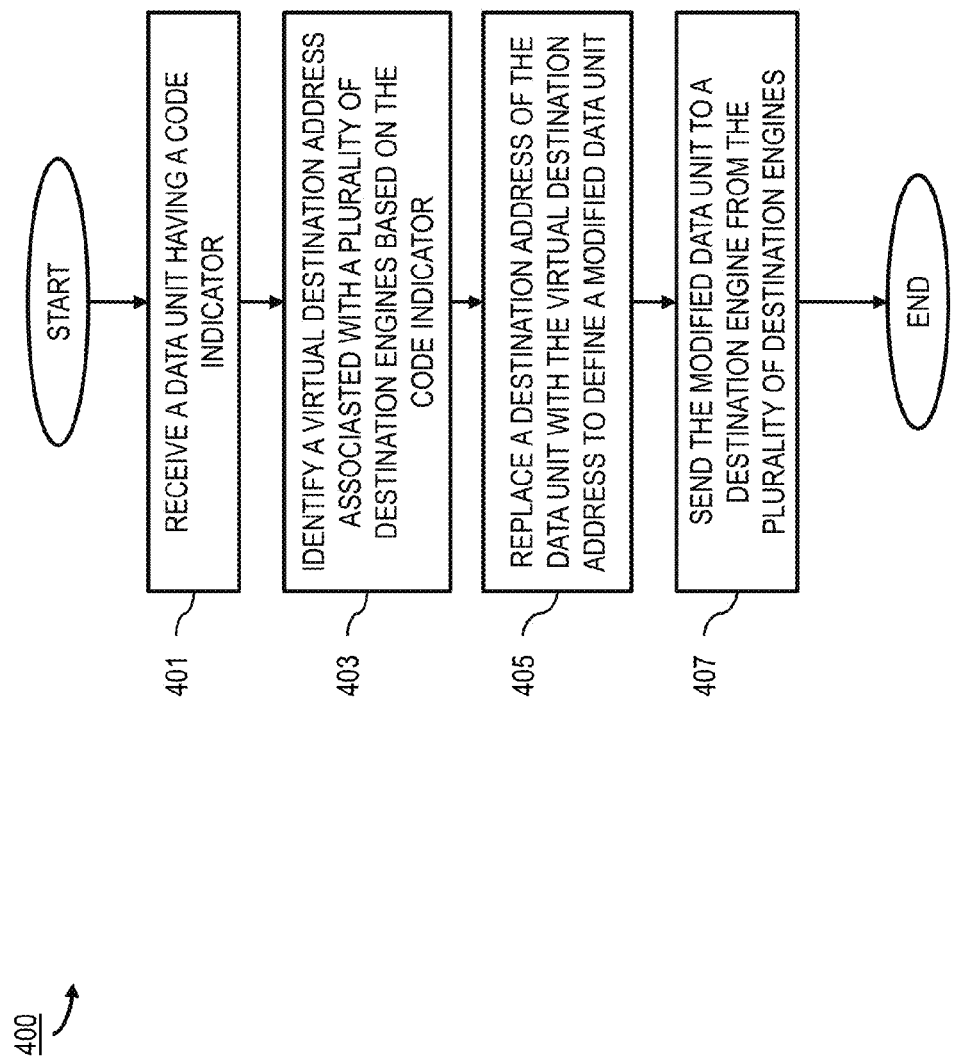
FIG. 4 is a flowchart of a process for providing routing to multiple destination engines in transaction management systems, according to an embodiment.

FIG. 4 is a flowchart of a process for providing routing to a set of destination engines in transaction management systems, according to an embodiment. As shown in FIG. 4, at 401 a data unit having a code indicator is received. For example, the data unit can be received at a routing management system 103, via an input signal such as input signal 217 of FIG. 2. Subsequently, at 403, a virtual destination address is identified based on the code indicator, the virtual destination address being associated with a set of destination engines 109a-109j. For example, the virtual destination address can be identified by the address identification/verification module 201 of FIG. 2. At step 405, a destination address of the data unit is replaced with the virtual destination address to define a modified data unit. For example, the destination address of the data unit can be replaced by the data modification module 203 of FIG. 2. At 407, the modified data unit is sent to a destination engine 109a-109j from the set of destination engines 109a-109j. For example, the modified data unit can be sent by the routing management system 103 of FIG. 1 and FIG. 2, via an output signal 219.

In some instances, the process of FIG. 4 can be performed while the routing management system 103 is disposed within a client device 101a-101n and is operatively coupled to a switching infrastructure (e.g., a switch fabric) within the communication network 105 that is operatively coupled to a destination engine 109a-109j. In such instances, the DNS query module 205 can send a Domain Name Service (DNS) query to the address identification/verification module 201 of FIG. 2, at a time before a process of FIG. 4, based on a code indicator. The DNS query module 205 receives a DNS response from the address identification/verification module 201 having an identified virtual destination address, of step 403, associated with a set of destination engines 109a-109j, in response to the DNS query. Furthermore, the routing management system 103 receives a data unit within the session.

In some instances, the process of FIG. 3 can be performed while the routing management system 103 is disposed within a switching infrastructure element within the communication network 105. The routing management system 103 can be operatively coupled to remaining portions of the switching infrastructure that is operatively coupled to a destination engine 109a-109j. In such instances, the virtual destination address, discussed above in connection with 403 of FIG. 4, is identified (at 403) by the address identification/verification module 201 based on a code indicator and/or based on a state information associated with the destination engine 109a-109j, identified by the destination engine(s) state module 207.

In some instances, the process of FIG. 4 can be performed while the routing management system 103 is disposed within a switching infrastructure element within the communication network 105. The routing management system 103 can be operatively coupled to remaining portions of the switching infrastructure that is operatively coupled to a set of destination engines 109a-109j. In such instances, the virtual destination address, discussed above in connection with 403 of FIG. 4, is identified (at 403) by the address identification/verification module 201 based on a code indicator and/or based on a state information associated with the set of destination engine 109a-109j, identified by the destination engine(s) state module 207.

In some instances, a virtual destination address, discussed above in connection with 403 of FIG. 4, is identified by the routing management system 103 based on a code indicator and a state information associated with a set of destination engines 109a-109j, identified by the destination engine(s) state module 207, the state information being based on an operative state of each destination engine 109a-109j from the set of destination engines 109a-109j and based on a load balance of the plurality of destination engines 109a-109j, identified by the load balancing module 209.

In some instances, the process of FIG. 4 can be performed while the routing management system 103 sends, as discussed above in connection with 405 and 407 of FIG. 4, a modified data unit by the data modification module 203, to a destination engine 109a-109j from of the set of destination engines 109a-109j. In such instances, the set of destination engines 109a-109j can be operatively coupled to a switching infrastructure within the communication network 105 that is operatively coupled to a client device 101a-101n without an intervening gateway 107a-107i. The elimination of gateway 107a-107i can improve latency of forward transactions.

In some instances, the process of FIG. 4 can be performed while a routing management system 103 receives a data unit, as discussed above in connection with 401 of FIG. 4, from a client device 101a-101n, via an input signal 217 of FIG. 2. In such instances, the routing management system 103 sends, as discussed above in connection with 407 of FIG. 4, via an output signal 219 of FIG. 2, the data unit modified by the data modification module 203 to a destination engine 109a-109j, such that an identification of the client device 101a-101n is verified, by the verification module 211 of FIG. 2, based on a source address of the data unit.

Figure 5:
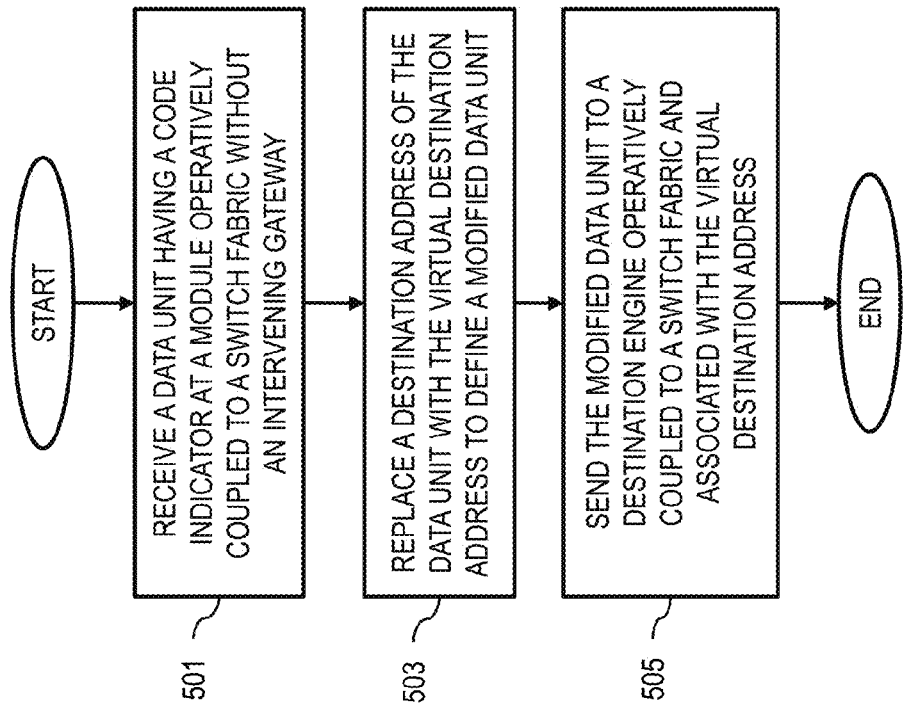
FIG. 5 is a flowchart of a process for providing routing in transaction management systems without an intervening gateway, according to an embodiment.

FIG. 5 is a flowchart of a process for providing routing in transaction management systems without an intervening gateway, according to an embodiment. In some instances, a routing management system 103 is operatively coupled to a switching infrastructure, within the communication network 105, without an intervening gateway 107a-107i. As shown in FIG. 5, at 501, a data unit having a code indicator is received. For example, the data unit can be received at a routing management system 103 via an input signal 217 of FIG. 2. Per step 503, a destination address of the data unit is replaced with a virtual destination address. For example, the virtual destination address can be identified by the address identification/verification module 201 of FIG. 2, based on the code indicator to define a modified data unit. Furthermore, the virtual destination address can be replaced by the data modification module 203. At 505 the modified data unit is sent to a destination engine 109a-109j operatively coupled to the switching infrastructure and associated with the virtual destination address. For example, the modified data unit can be sent by the routing management system 103 of FIG. 1 and FIG. 2, while the virtual destination address is identified by the address identification/verification module 201 of FIG. 2.

In some instances, the process of FIG. 5 can be performed while the routing management system 103, operatively coupled to a switching infrastructure without an intervening gateway 107a-107i, is disposed within a client device 101a-101n operatively coupled to the switching infrastructure, within the communication network 105 that is operatively coupled to a destination engine 109a-109j. In such instances, the DNS query module 205 can send a Domain Name Service (DNS) query to the address identification/verification module 201 of FIG. 2, at a time before a process of FIG. 5, based on a code indicator. The DNS query module 205 receives a DNS response from the address identification/verification module 201 having an identified virtual destination address, of step 503, in response to DNS query. Furthermore, the routing management system 103 receives a data unit within the session.

In some instances, the process of FIG. 5 can be performed while the routing management system 103, operatively coupled to a switching infrastructure without an intervening gateway 107a-107i, is disposed within a switching infrastructure element, within the communication network 105. The routing management system 103 can be operatively coupled to remaining portions of the switching infrastructure that is operatively coupled to a destination engine 109a-109j. In such instances, the virtual destination address, discussed above in connection with 503 of FIG. 5, is identified (at 503) by the address identification/verification module 201 based on a code indicator and/or based on a state information associated with a destination engine 109a-109j, identified by the destination engine(s) state module 207 of FIG. 2.

In some instances, the process of FIG. 5 can be performed while a destination engine 109a-109j is a first destination engine within a set of destination engines 109a-109j and routing management system 103, operatively coupled to a switching infrastructure without an intervening gateway 107a-107i, is disposed within a switching infrastructure element, within the communication network 105, operatively coupled to remaining portions of the switching infrastructure. In such instances, the virtual destination address, discussed above in connection with 503 of FIG. 5, is identified (at 503) by the address identification/verification module 201 $s$ based on a code indicator and/or based on a state information associated with the set of destination engines 109a-109j. Furthermore, a modified data unit, discussed above in connection with 505 of FIG. 5, modified by the data modification module 203 is sent, to the first destination engine, for example by the routing management system 103 of FIG. 1 and FIG. 2.

In some instances, the process of FIG. 5 can be performed while a virtual destination address, discussed above in connection with 503 of FIG. 5, is identified by the address identification/verification module 201$s$ based on a code indicator and/or based on a state information associated with a set of destination engines 109a-109j, identified by the destination engine(s) state module 207, the state information being based on an operative state of each destination engine 109a-109j from the set of destination engines 109a-109j and based on a load balance of the set of destination engines 109a-109j, identified by the load balancing module 209 of FIG. 2. In such instances, the routing management system 103, operatively coupled to a switching infrastructure without an intervening gateway 107a-107i, can send a modified data unit, discussed above in connection with 505 of FIG. 5, modified by the data modification module 203, to a destination engine 109a-109j from the set of destination engines 109a-109j, via an output signal 219 of FIG. 2.

In some instances, the process of FIG. 5 can be performed while the routing management system 103, operatively coupled to a switching infrastructure without an intervening gateway 107a-107i, receives a data unit, discussed above in connection with 501 of FIG. 5, from a client device 101a-101n, via an input signal 217 of FIG. 2. The routing management system 103 can send the modified data unit, discussed above in connection with 505 of FIG. 5, modified by the data modification module 203, via an output signal 219, to a destination engine 109a-109j, such that an identification of the client device 101a-101n is verified, by the verification module 211, based on a source address of the data unit.

Figure 6:
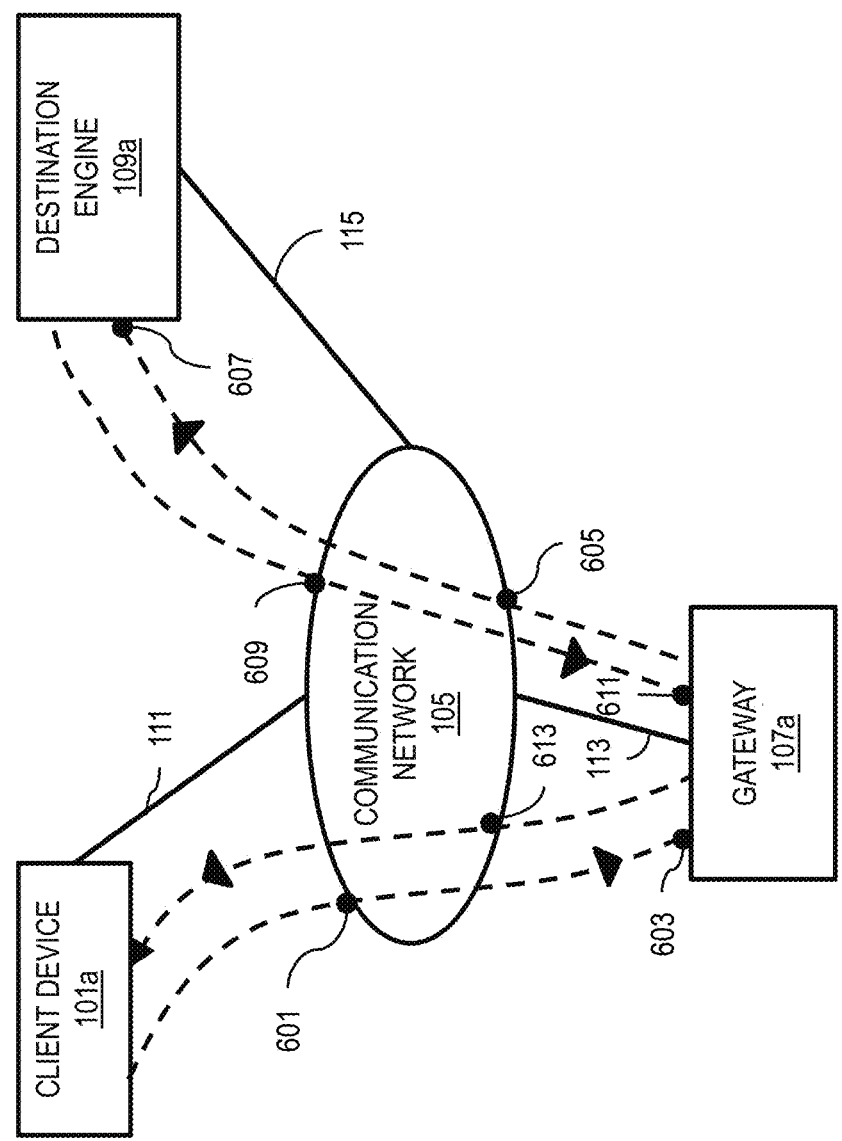
FIG. 6 is a schematic diagram of routing via an intervening gateway, according to an embodiment.

FIG. 6 is a schematic diagram of routing via an intervening gateway, according to an embodiment. In the example of FIG. 6, the dotted arrows show a data transaction path from a client device 101a to a destination engine 109a. The data transaction path shows data (e.g., a data unit as discussed above in connection with FIGS. 2 through 5) being received, shown by port 601, from the client device 101a at a communication network 105 (e.g., a switch fabric within the communication network 105). The data unit is then forwarded from the communication network 105 to a gateway 107a and received at the gateway at port 603. The forwarding functionality of the gateway 107a enables the gateway to direct the received data unit to a destination engine 109a, via the communication network 105. The data unit is received at the communication network at port 605 and at the destination engine 109a at port 607. Furthermore, the destination engine 109a performs the matching process on the data unit and sends the processed data unit back to the client device 101a via the same data transaction path. The data unit is received at the communication network 105 at port 609, arrives at the gateway 107a at port 611, received at the communication network 105 from the gateway 107a at port 613 and sent to the client device 101a by the communication network 105. If the time delay at the communication network 105 is represented as "C", the time delay at the gateway 107a is represented as "G", and the time delay at the destination engine is represented as "D". The latency of the data transaction cycle of FIG. 6 (L1) can be summarized as:

$$L1=4*C+2*G+D$$

Elimination of gateway 107a however, as discussed above, can reduce the latency, as further discussed in connection with FIG. 7.

Figure 7:
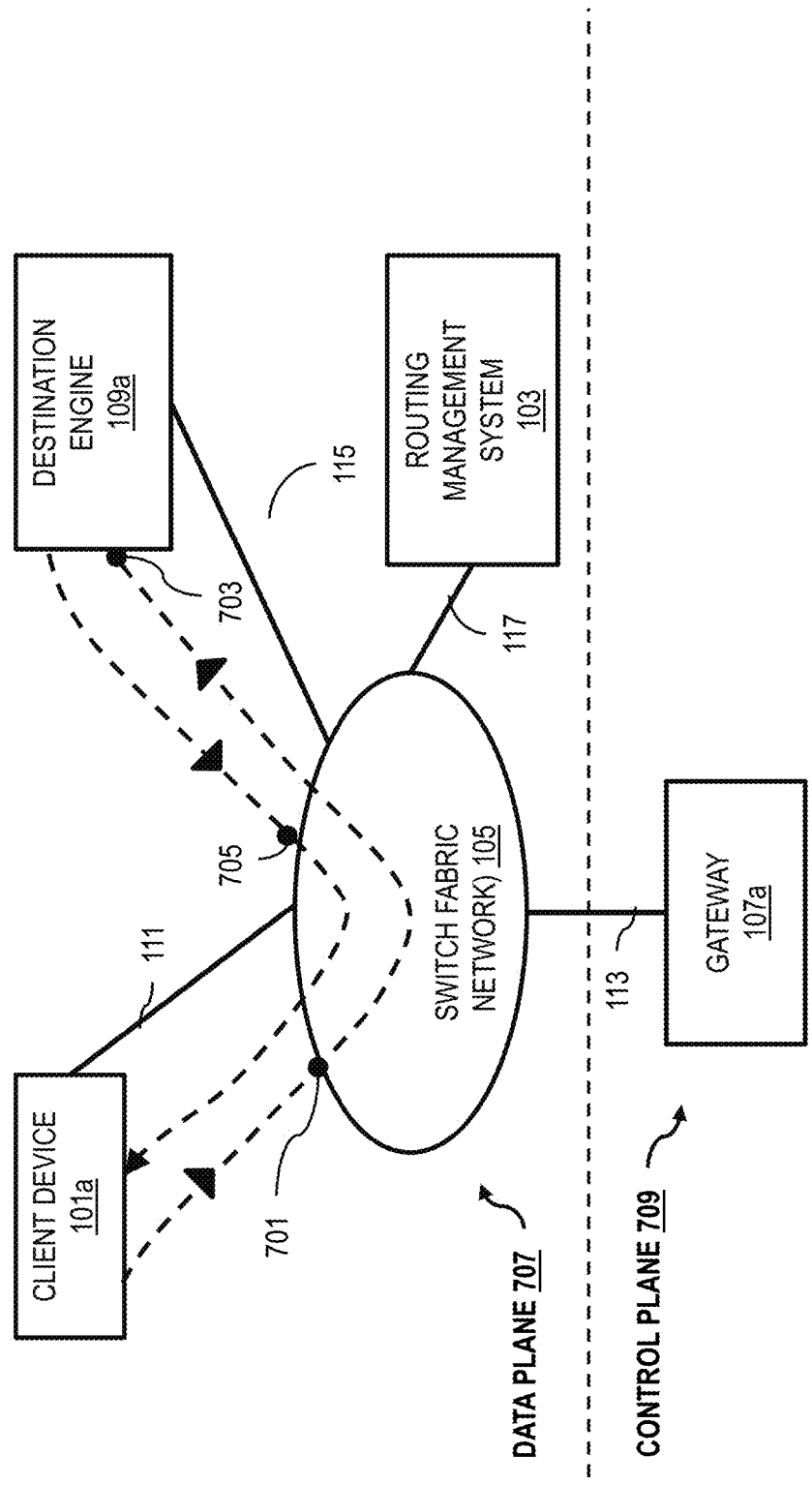
FIG. 7 is a schematic diagram of routing without an intervening gateway, according to an embodiment.

FIG. 7 is a schematic diagram of routing without an intervening gateway, according to an embodiment. FIG. 7 shows a separation of the data plane 707 and the control plane 709 that can divide the communication system of FIG. 7 into segments as the data plane 707 and the control plane 709. In such embodiments, the control plane 709, which includes gateway 107a, provides control over the components/devices of the data plane 707. The flow of data between client device 101a, the communication network 105, and the destination engines 109a, however, can be managed by the routing management system 103 without an intervening gateway 107a. Furthermore, the forwarding functionality of the gateway 107a is incorporated into the communication network 105 by the routing management system 103, as discussed above in connection with FIGS. 2 through 5.

In the example of FIG. 7, the dotted arrows show a data transaction path between a client device 101a and a destination engine 109a. The data transaction path shows data (e.g., a data unit as discussed above in connection with FIGS. 2-5) being received, shown as port 701, from the client device 101a at a communication network 105 (e.g., a switch fabric within the communication network 105). The data unit is then forwarded from the communication network 105 directly to a destination engine 109a. The data unit is received at the destination engine 109a at port 703. The destination engine 109a, performs the matching process on the data unit and sends the processed data unit back to the client device 101a via the same data transaction path, where the data unit is received at the communication network 105 at port 705 and is sent to the client device 101a by the communication network 105. If the time delay at the communication network 105 is represented as "C", and the time delay at the destination engine is represented as "D". The latency of the data transaction cycle of FIG. 7 (L2) can be summarized as:

$$L2=2*C+D$$

As shown by the comparison between latencies L1 and L2, latency L2 is noticeably smaller than latency L1 and that elimination of the gateway can improve routing efficiency.

It is intended that the systems and methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. An apparatus, comprising:
a routing module disposed within a client device and configured to:
   receive, during a session, a data unit having: (1) a financial transaction code indicator for a transaction initiated via the client device, and (2) a destination address,
   send a Domain Name Service (DNS) query, at a time before the session, based on the financial transaction code indicator,
   receive a DNS response having a virtual destination address in response to the DNS query, the virtual destination address being associated with a destination engine of a plurality of destination engines,
   identify a selected virtual destination address of a plurality of virtual destination addresses based on the financial transaction code indicator and state information associated with an operative state of at least one destination engine from the plurality of destination engines,
   replace the destination address of the data unit with the selected virtual destination address to define a modified data unit, and
   send the modified data unit to a selected destination engine associated with the selected virtual destination address such that the selected destination engine conducts a trade associated with the financial transaction code indicator.

2. The apparatus of claim 1, wherein:
the client device is configured to be operatively coupled to a switch fabric that is operatively coupled to the destination engine,
the routing module configured to receive the data unit within the session.

3. The apparatus of claim 1, wherein:
the client device is configured to be operatively coupled to a switch fabric that is operatively coupled to the destination engine associated with the selected virtual destination address.

4. The apparatus of claim 1, wherein:
the client device is configured to be operatively coupled to a switch fabric that is operatively coupled to the plurality of destination engines associated with the virtual destination address, the destination engine being from the plurality of destination engines.

5. The apparatus of claim 1, wherein:
the state information is further based on a load balance of the plurality of destination engines.

6. The apparatus of claim 1, wherein:
the routing module is configured to send the modified data unit to the selected destination engine operatively coupled to a switch fabric that is operatively coupled to the client device without an intervening gateway device.

7. An apparatus, comprising:
a routing module disposed within a client device and configured to receive a data unit having a transaction code indicator for a transaction initiated via the client device, the transaction code indicator associated with a stock ticker, the routing module configured to send a Domain Name Service (DNS) query at a time before a session based on the code indicator, the routing module configured to receive a DNS response having a virtual destination address in response to the DNS query, the virtual destination address being associated with a plurality of destination engines, the routing module configured to replace a destination address of the data unit with the virtual destination address to define a modified data unit, the routing module configured to send the modified data unit to a destination engine from the plurality of destination engines such that the destination engine conducts a trade associated with the stock ticker.

8. The apparatus of claim 7, wherein:

the routing module is disposed within the client device configured to be operatively coupled to a switch fabric that is operatively coupled to the destination engine, the routing module configured to receive the data unit within the session.

9. The apparatus of claim 7, wherein:

the client device is configured to be operatively coupled to a switch fabric that is operatively coupled to the destination engine, the routing module configured to identify the virtual destination address based on the transaction code indicator and state information associated with the destination engine.

10. The apparatus of claim 7, wherein:

the routing module configured to identify the virtual destination address based on the transaction code indicator and state information associated with the plurality of destination engines, the state information being based on an operative state of each destination engine from the plurality of destination engines and based on a load balance of the plurality of destination engines.

11. The apparatus of claim 7, wherein:

the routing module is configured to send the modified data unit to the destination engine that is operatively coupled to a switch fabric that is operatively coupled to the client device without an intervening gateway device.

12. The apparatus of claim 7, wherein:

the routing module is configured to send the modified data unit to the destination engine such that an identification of the client device is verified based on a source address of the data unit.

13. An apparatus, comprising:

a routing module disposed within a client device and configured to be operatively coupled to a switch fabric without an intervening gateway device, the routing module configured to receive a data unit having a financial code indicator for a transaction initiated via the client device, the routing module configured to replace a destination address of the data unit with a virtual destination address based on the financial code indicator to define a modified data unit, the virtual destination address associated with a destination engine that is operatively coupled to the switch fabric, the routing module configured to send the modified data unit to the destination engine such that the destination engine conducts a trade associated with the financial transaction code indicator in response to the modified data unit.

14. The apparatus of claim 13, wherein:

the client device is configured to be operatively coupled to the switch fabric that is operatively coupled to the destination engine, the routing module configured to send a Domain Name Service (DNS) query at a time before a session based on the financial code indicator, the routing module configured to receive a DNS response having the virtual destination address in response to the DNS query, the routing module configured to receive the data unit within the session.

15. The apparatus of claim 13, wherein:

the client device is configured to be operatively coupled to the switch fabric that is operatively coupled to a destination engine, the routing module configured to identify the virtual destination address based on the financial code indicator and state information associated with the destination engine.

16. The apparatus of claim 13, wherein:

the routing module configured to identify the virtual destination address based on the financial code indicator and state information associated with a plurality of destination engines, the destination engine being from the plurality of destination engines, the state information being based on an operative state of each destination engine from the plurality of destination engines and based on a load balance of the plurality of destination engines.

17. The apparatus of claim 13, wherein:

the routing module is configured to send the modified data unit to the destination engine such that an identification of the client device is verified based on a source address of the data unit.

* * * * *